United States Patent

Lamb

[11] Patent Number: 5,120,018
[45] Date of Patent: Jun. 9, 1992

[54] ELECTRICALLY OPERATED REFRIGERANT EXPANSION VALVE

[75] Inventor: John D. Lamb, LaFayette, N.Y.

[73] Assignee: Carrier Corporation, Syracuse, N.Y.

[21] Appl. No.: 733,788

[22] Filed: Jul. 22, 1991

[51] Int. Cl.⁵ .......................... F16K 31/06; F16K 3/12
[52] U.S. Cl. ................................ 251/129.15; 251/127
[58] Field of Search ................... 251/327, 129.15

[56] References Cited

U.S. PATENT DOCUMENTS

| | | | |
|---|---|---|---|
| 1,237,719 | 8/1917 | Spencer | 251/327 X |
| 3,042,361 | 7/1962 | Garrott | 251/327 X |
| 3,871,615 | 3/1975 | Donner | 251/327 X |
| 4,561,471 | 12/1985 | Diaz | 251/129.15 X |

Primary Examiner—Arnold Rosenthal

[57] ABSTRACT

An electrically operated refrigerant expansion valve has a refrigerant metering orifice extending therethrough. The valve includes a tapered opening extending thereinto, generally transverse to and intersecting the refrigerant metering orifice. A tapered valve member extends into the tapered opening to cooperate with the tapered opening to control the flow of refrigerant through the valve. The cooperation of the tapered valve member and the tapered opening is such that the flow through the valve body is completely shut off when the tapered valve member is fully inserted into the tapered opening. An electrically actuatable means is mounted on the valve for imparting axial movement to the tapered valve member into and out of the tapered opening.

4 Claims, 1 Drawing Sheet

ELECTRICALLY OPERATED REFRIGERANT EXPANSION VALVE

BACKGROUND OF THE INVENTION

1. Field of the Invention

This invention relates in general to electrically actuated valves and more specifically to electrically actuated expansion valves for refrigeration systems.

2. Description of the Prior Art

Several types of electrically actuated valves suitable for use as expansion valves in refrigeration or air conditioning systems are known in the prior art. One type includes a solenoid connected to an appropriate electrical supply which, in response to a pulsed electrical signal, actuates a plunger or control element alternately into and out of a flow path through the expansion valve body to permit or prevent fluid flow. Another type of electrically actuated expansion valve has a rotary actuator with a means for converting the rotary motion into linear motion for operating a valve element to increase or decrease the flow area available through the valve body by seating against the valve seat to close the valve and prevent flow, or, moving linearly away from the valve seat, to permit flow through an area defined by the area of the opening between the valve element and the valve seat.

Representative U.S. patents which disclose solenoid actuated valves of this type include: U.S. Pat. No. 4,632,358 entitled Automotive Air Conditioning System Including Electrically Operated Expansion Valve; U.S. Pat. No. 4,807,445 entitled Refrigeration System, and, U.S. Pat. No. 4,840,039 entitled Automated Expansion Valve For a Refrigeration Circuit.

U.S. Pat. No. 4,986,085 entitled Incremental Electrically Actuated Valve discloses a refrigerant expansion valve of the type linearly actuated by a rotary stepper motor.

SUMMARY OF THE INVENTION

It is an object of the present invention to provide an electrically actuated refrigerant expansion valve of simple design which allows the metering of refrigerant therethrough in either direction.

It is another object of the invention to provide such a valve which is capable of complete shut off of flow through the valve.

It is yet another object of the present invention to achieve complete shut-off in such a valve with a tapered valve seat and a tapered valve member.

These and other objects of the present invention are achieved by an electrically operated refrigerant expansion valve which includes a valve body having first and second fluid access openings formed in opposite ends thereof. The valve body includes a refrigerant metering orifice which establishes fluid communication between the first and second openings. The valve body also includes a tapered opening extending thereinto from one side. The tapered opening is generally transverse to and intersects the refrigerant metering orifice. The tapered opening decreases in cross sectional area in the direction from the outside of the body into the body. The tapered opening has a cross sectional area at the intersection with the orifice which is larger than the cross sectional area of the orifice. A tapered valve member extends into the tapered opening to cooperate with the tapered opening to control the flow of refrigerant through the valve body. The cooperation of the tapered valve member and the tapered opening is such that the flow through the valve body is completely shut off when the tapered valve member is fully inserted into the tapered opening. An electrically actuatable means is mounted on the valve body for operatively engaging the tapered valve member and for imparting axial movement to the tapered valve member into and out of the tapered opening.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts, and wherein:

DESCRIPTION OF THE PREFERRED EMBODIMENT

Figure 1:
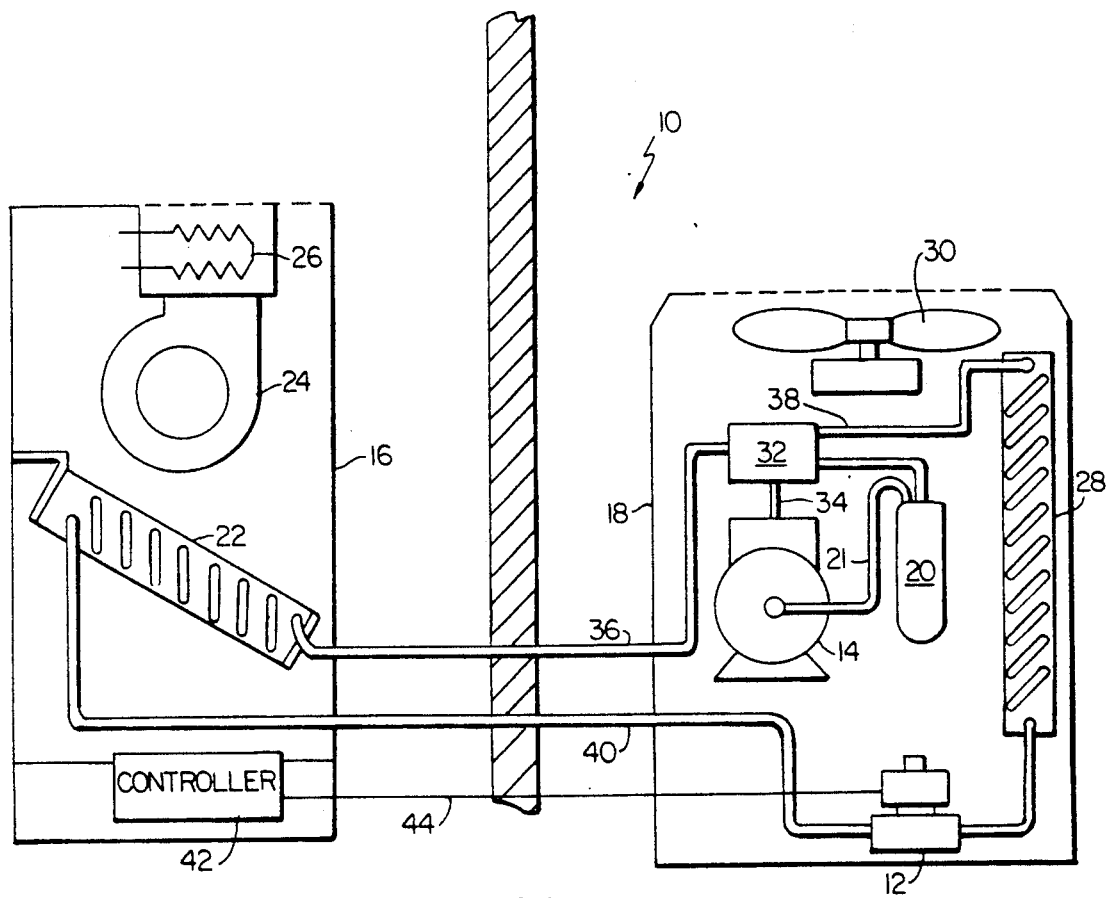
FIG. 1 is a schematic diagram of a heat pump system making use of an expansion device according to the present invention.

With reference first to FIG. 1, numeral 10 designates a heat pump of substantially conventional design which incorporates an electrically operated refrigerant expansion valve 12 according to the present invention. The expansion valve 12 is capable of controlling refrigerant flow in either direction therethrough and accordingly replaces the multiple expansion devices and check valves found in the refrigerant line between the heat exchangers of many prior art heat pumps. The operation of the dual flow electrically actuatable expansion valve 12 will be described more fully hereinafter.

The heat pump 10 also includes a compressor 14, an indoor heat exchanger assembly 16 and an outdoor heat exchanger assembly 18. An accumulator 20 is shown in the compressor suction line 21, however, it is contemplated that, because of the location of the expansion valve 12, and because of the variable metering capability of such a valve, the accumulator may not be needed.

The indoor heat exchange assembly 16 includes a refrigerant-to-air heat exchange coil 22 and an indoor fan 24. The indoor heat exchange assembly is also shown with a backup electrical resistance heating coil 26. The outdoor heat exchanger assembly 18 includes a refrigerant-to-air heat exchange coil 28 and an outdoor fan 30. The indoor and outdoor heat exchanger assemblies are of conventional design and will not be described further herein.

A four way reversing valve 32 is connected to the compressor discharge port by a refrigerant line 34, to the compressor suction port by suction line 21 and to coils 22 and 28 by refrigerant lines 36 and 38, respectively. The reversing valve 32 is also of conventional design for directing high pressure refrigerant vapor from the compressor to either the indoor coil 22, in the heating mode of operation or, during the cooling mode and defrost, to the outdoor coil 28. Regardless of the mode of operation, the reversing valve 32 serves to return refrigerant from the coil which is operating as an evaporator to the compressor 14.

A refrigerant line 40 interconnects the indoor heat exchanger coil 22 and the outdoor heat exchanger coil 28. The dual flow, positive shut off electrically actuated expansion valve 12 according to the present invention, is located in the line 40 within the outdoor heat exchange assembly housing 18, adjacent to the outdoor coil 28. A controller 42 is shown located within the indoor heat exchanger assembly 16 and is interconnected to the expansion valve 12 by a suitable control cable 44.

The electrically actuatable expansion valve 12 could be of the type which includes a solenoid connected to an appropriate electrical supply which in response to a pulsed electrical signal actuates a plunger or control element alternately into and out of the flow path of the refrigerant through the expansion valve. It could also be of the type commonly referred to as an electrically actuated rotary actuator. Such an actuator, as described in previously noted U.S. Pat. No. 4,986,085, includes means for converting rotary motion into linear motion for operating the valve element.

Figure 2:
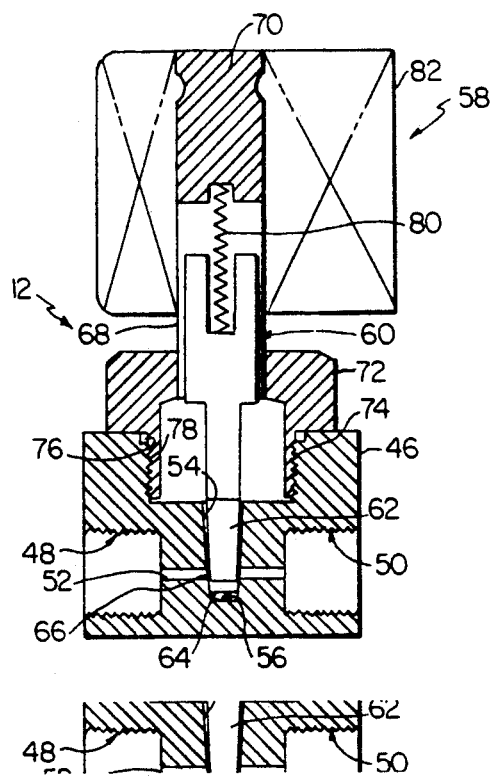
FIG. 2 is a longitudinal sectional view through a solenoid actuated expansion device according to the present invention.

Referring now to FIG. 2 an electrically actuated expansion valve 12 of the type actuated by a solenoid is shown. Preferably, the expansion valve 12 is a low cost, direct operated solenoid actuated valve. It will be understood, as the description continues, that, when the solenoid valve 12 is energized, it is fully opened, and, when it is de-energized, it is closed and all flow of refrigerant through the valve is blocked. The expansion valve 12 includes a valve body 46 having a pair of fluid access openings 48 and 50 formed in opposite sides thereof. The openings 48 and 50 are internally threaded to provide easy attachment thereof to appropriately threaded refrigeration line fittings. A refrigerant metering orifice 52 establishes fluid communication between the two access openings 48 and 50 to thereby complete the refrigerant flow path through the valve body 46.

Extending into the valve body 46 from one side thereof is a tapered opening 54. The tapered opening 54 is substantially perpendicular to the refrigerant metering orifice 52 and intersects with the refrigerant metering orifice. The tapered opening 54 extends into the valve body 46 a distance beyond the intersection with the orifice 52 where it terminates at a blind end 56. The tapered opening 54 is circular in cross section and has a cross sectional area that decreases from a maximum, at the outside of the body 46, to a minimum value at its interior blind end 56.

As generally indicated by reference numeral 58, a solenoid actuator is provided for the expansion valve 12. The solenoid actuator includes a moveable piston 60, which is axially moveable with respect to the valve body 46 as will be appreciated. The lower end of the piston 60 defines a tapered valve member 62. The tapered valve member is axially moveable with the piston 60 and extends into the tapered opening 54 to cooperate with the tapered opening to control the flow of refrigerant through the valve body 46. The tapered valve member 62 is configured so that the cooperation of the tapered valve member 62 and the tapered opening 54 is such that the flow through the valve body, i.e. through the orifice 52 is completely shut off when the tapered valve member 62 is fully inserted into the tapered opening 54. As shown in FIG. 2 the tapered valve member 62 is shown in a non-sealing position with respect to the tapered opening 54 in order to facilitate illustration of the elements.

Positioned in the blind end 56 of the tapered opening 54 is an elastomeric seal element 64. The lower end 66 of the tapered valve member 62 is configured to engage the seal 64 when the tapered valve member 62 is in its full downward, sealing position. The elastomeric seal 64 also lessens impact loads of the valve member 62 as it moves toward its closed position and as it engages the tapered opening 54. The solenoid actuator 58 further includes an axial tube 68 which has a solenoid core 70 disposed therein and which is fixidly held in place within the tube 68. The lower end of the tube 68 is sealingly secured, as by welding or the like, to an intermediate solenoid attachment plug 72. The plug 72 is adapted to be threadably mounted via external threads 74, to the valve body 46, by engagement with mating threads 76 formed in an opening 78 in the side of the valve body. The opening 78 is in co-axial relationship with the tapered opening 54.

A compression spring 80 is interposed between the upper end of the axially moveable piston 60 and the solenoid core 70 to thereby resiliently bias the piston and the tapered valve member 62 carried thereby away from the core 70 towards its closed position and engagement with the tapered opening 54. A solenoid coil 82 surrounds the tube 68. It will be understood that suitable electrical lead wires (not shown) extend from the coil to selectively energize and de-energize the coil.

As pointed out above, variable flow through the valve may be achieved by having the solenoid coil 82 energized by a pulse-width modulated voltage signal. A system for operating an expansion valve in such a manner is described in U.S. Pat. No. 4,459,819 "Pulse Controlled Expansion Valve and Method".

As previously discussed in connection with FIG. 1 the electrically operate dual flow refrigerant expansion valve 12 is installed in the refrigerant line 40 extending between the indoor coil 22 and the outdoor coil 28 of a heat pump system. As shown, the expansion device 12 is positioned in the outdoor heat exchanger assembly 18 close to the outdoor coil 28. As so positioned and operating under the pulse width modulated signal from the controller 42 the expansion valve 12 will operate to control the flow of refrigerant from the outdoor coil 28 to the indoor coil 22, when the system is operating in the cooling mode of operation, and, from the indoor coil 22 to the outdoor coil 28 when operating in the heating mode of operation.

As pointed out above, when the valve 12 is not energized the spring 80 will urge the valve member 60 downwardly to bias the tapered valve member 62 into sealing engagement with the tapered opening 54 to form a positive seal against refrigerant flow through the valve. As a result of the above described positive shut off feature, the expansion valve 12 is capable of preventing refrigerant migration therethrough when it is installed in a system and the system is shut off. It also follows that the system is able to maintain a pressure differential between the high and low sides of the system when shut off. A direct benefit of this is that the Degradation Coefficient Cd of the refrigeration system is reduced. The Degradation Coefficient is a term defined by the U.S. Department of Energy which relates to the measure of the efficiency loss of a system due to cycling of the system.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. An electrically operated refrigerant expansion valve comprising:
    a valve body having;
        first and second fluid access openings formed at opposite ends thereof;
        a refrigerant metering orifice establishing fluid communication between said first and second openings;
        a tapered opening, extending into said body from one side thereof, said tapered opening being generally transverse to and intersecting said refrigerant metering orifice, said opening decreasing in cross-sectional area in the direction from said one side into said body and terminating in a blind end at a position beyond said intersection with said orifice, said tapered opening further having a cross-sectional area at the intersection with said orifice which is larger than the cross sectional area of said orifice;
    seal means positioned in said blind end;
    a tapered valve member extending into said tapered opening to cooperate with said tapered opening to control the flow through said valve body, the cooperation of said tapered valve member and said tapered opening being such that the flow through said valve body is completely shut off when said tapered valve member is fully inserted into said tapered opening, said tapered valve member sealingly engaging said seal means when it is fully inserted into said tapered opening and;
    electrically actuatable means mounted on said one side of said valve body for operatively engaging said tapered valve member and for imparting axial movement to said tapered valve member into and out of said tapered opening.

2. The apparatus of claim 1 wherein at least a part of said tapered valve member is made from a magnetic material, and, said electrically actuatable means comprises a solenoid coil.

3. The apparatus of claim 2 further including spring means for yieldably biasing said tapered valve member into sealing engagement with said tapered opening.

4. An electrically operated refrigerant expansion valve comprising:
    a valve body having;
        first and second fluid access openings formed at opposite ends thereof;
        a refrigerant metering orifice establishing fluid communication between said first and second openings;
        a tapered opening, extending into said body from one side thereof, said tapered opening being generally transverse to and intersecting said refrigerant metering orifice, said opening decreasing in cross sectional area in the direction from said one side into said body and terminating in a blind end at a position beyond said intersection with said orifice, said tapered opening further having a cross sectional area at the intersection with said orifice which is larger than the cross sectional area of said orifice;
    seal means positioned in said blind end;
    a solenoid mounted on said one side of said valve body, said solenoid having a moveable piston extending into said tapered opening, the end of said piston which extends into said tapered opening being formed as a tapered valve member to cooperate with said tapered opening to control the flow through said valve body, the cooperation of said tapered valve member and said tapered opening being such that the flow through said valve body is completely shut off when said tapered valve member is fully inserted into said tapered opening, said tapered valve member sealingly engaging said seal means when it is fully inserted into said tapered opening; and
    spring means for yieldably biasing said piston into said valve body.

* * * * *